United States Patent
Dangaltchev

(10) Patent No.: US 7,958,005 B2
(45) Date of Patent: Jun. 7, 2011

(54) BIDDING FOR ADVERTISEMENT POSITIONS OTHER THAN ONE

(75) Inventor: Tchavdar Dangaltchev, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 11/930,973

(22) Filed: Oct. 31, 2007

(65) Prior Publication Data

US 2009/0112609 A1    Apr. 30, 2009

(51) Int. Cl.
G06Q 30/00        (2006.01)
(52) U.S. Cl. .................. 705/14; 705/14.43; 705/14.54; 705/14.71
(58) Field of Classification Search .............. 705/14, 705/14.4, 14.43, 14.54, 14.71, 14.73
See application file for complete search history.

(56) References Cited

U.S. PATENT DOCUMENTS

| | | | |
|---|---|---|---|
| 7,043,450 B2 | 5/2006 | Velez | |
| 7,085,732 B2 | 8/2006 | Gould | |
| 7,092,901 B2 | 8/2006 | Davis | |
| 7,349,876 B1 * | 3/2008 | Veach | 705/35 |
| 7,668,748 B1 * | 2/2010 | Veach | 705/14.69 |
| 7,707,053 B2 * | 4/2010 | Veach | 705/7 |
| 2001/0051911 A1 | 12/2001 | Marks | |
| 2002/0082983 A1 | 6/2002 | Oshiba | |
| 2004/0267806 A1 | 12/2004 | Lester | |
| 2005/0119963 A1 | 6/2005 | Ko | |
| 2005/0137939 A1 | 6/2005 | Calabria | |
| 2005/0144065 A1 | 6/2005 | Calabria | |
| 2006/0190385 A1 | 8/2006 | Dresden | |
| 2006/0253434 A1 | 11/2006 | Beriker | |
| 2007/0027754 A1 | 2/2007 | Collins | |

OTHER PUBLICATIONS

Borgs, Christian et al., "Dynamics of Bid Optimization in Online Advertisement Auctions"; WWW 2007; May 8-12, 2007; Banff, Alberta, Canada, pp. 531-540. http://delivery.acm.org/10.1145/1250000/1242644/p531-borgs.pdf?key1=1242644&key2=2805263811&coll=GUIDE&dl=GUIDE&CFID=23101732&CFTOKEN=27712817.

Edelman, Benjamin et al., "Internet Advertising and the Generalized Second-Price Auction: Selling Billions of Dollars Worth of Keywords"; Aug. 1, 2006; pp. 1-25; http://www.benedelman.org/publications/gsp-060801.pdf.

Graham, Jefferson, "Google Ad Sales Outpace All Comers"; Jul. 5, 2007; pp. 1-3 http://www.usatoday.com/tech/news/2006-10-30-google-ads-usat_x.htm.

* cited by examiner

Primary Examiner — Lindsay M. Maguire
(74) Attorney, Agent, or Firm — Shook, Hardy & Bacon L.L.P.

(57) ABSTRACT

Methods, systems, and computer storage media having computer-executable instructions embodied thereon that, when executed, perform methods for determining bid amounts necessary to ensure advertisements or other content items will be presented in designated positions other than the most prominent (or first) position when bid information associated with a lesser included match type is not requested, are provided. Bids are received that are associated with a given keyword, a content item and a desired placement position. Based thereupon, a placement position in which the bid will cause associated content item is determined and compared to the desired placement position. If the determined placement position is not within a given error threshold of the desired placement position, the bid is iteratively adjusted in such a way that an adjusted bid amount is determined which will ensure placement in the desired position.

19 Claims, 4 Drawing Sheets

BIDDING FOR ADVERTISEMENT POSITIONS OTHER THAN ONE

BACKGROUND

When content is displayed as a result of a search request received by a network, for instance, the Internet, advertisements or other content items for which payment is received in exchange for the presentation thereof often are presented in conjunction with the search results. Advertisers and/or other content providers generally bid a particular amount, the monetization of which (such monetization being based on a number of known pricing models, e.g., cost per impression, cost-per-click, and the like), when compared to bids received by other advertisers and/or content providers, results in presentation of the desired content in a particular position relative to the content offered by the other providers. For instance, the advertiser offering the greatest monetization value for a given keyword will have its advertisement placed in the most prominent position when a user places a search query having the given keyword.

SUMMARY

Embodiments of the present invention relate to systems and methods for determining bid amounts necessary to ensure advertisements will be presented in particularly designated positions other than the most prominent (or first) position when bid information associated with a lesser included match type (such match types including, from narrow to broad, exact match, phrase match, and broad match) is not requested. Based on historical data and the like, the placement position in which a received bid will cause an associated content item (e.g., advertisement) to be placed is compared to the desired position. If the determined placement position is not within a given error threshold of the desired position, the bid is iteratively adjusted in such a way that an adjusted bid amount is determined which will ensure placement in the desired position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
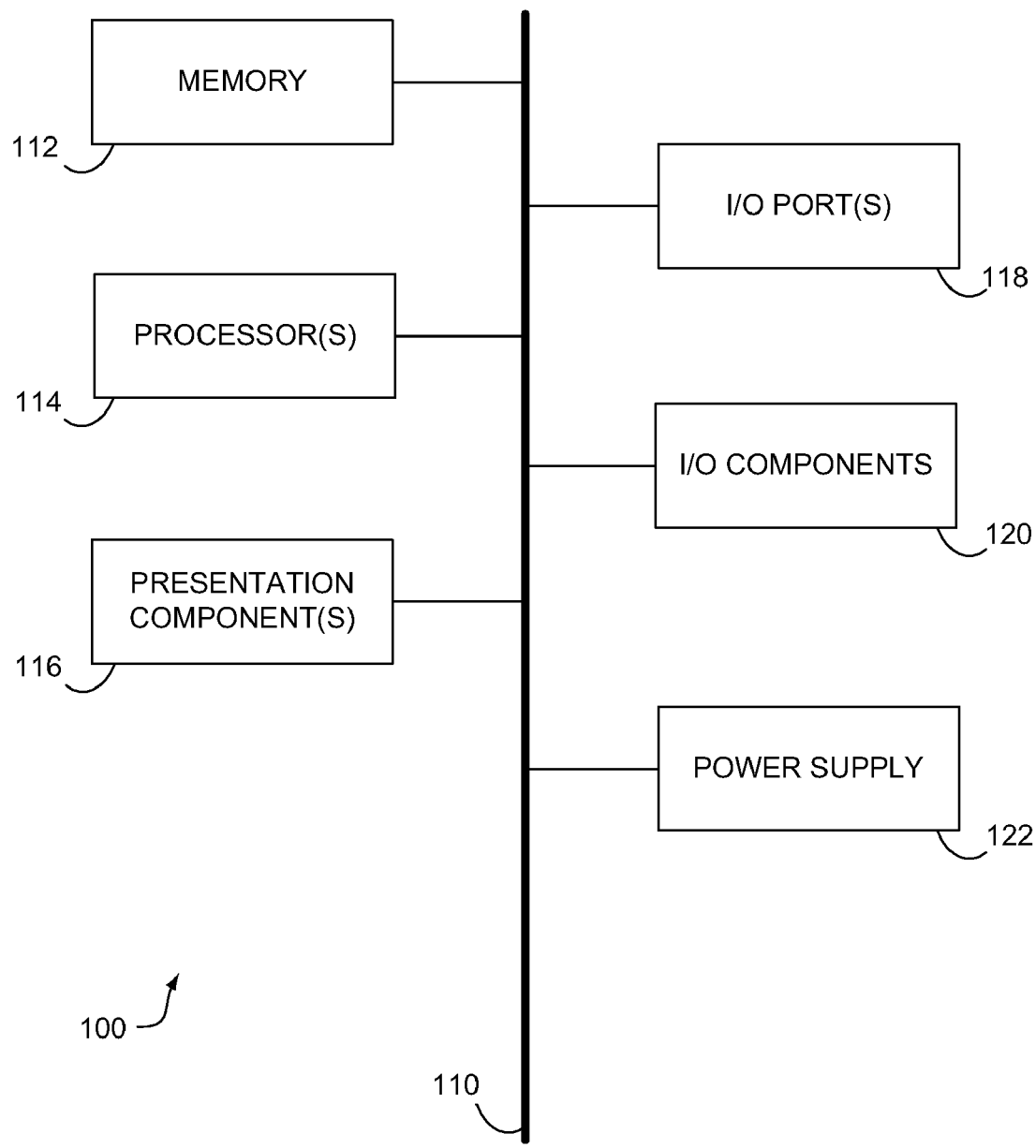
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems and methods for determining bid amounts necessary to ensure advertisements (or other content items for which payment is exchanged for presentation thereof) will be presented in particularly designated positions other than the most prominent (or first) position when bid information associated with a lesser included match type (such match types including, from narrow to broad, exact match, phrase match, and broad match) is not requested. Based on historical data and the like, the placement position in which a received bid will cause an associated content item to be placed is compared to the desired placement position. If the determined placement position is not within a given error threshold of the desired placement position, the bid is iteratively adjusted in such a way that an adjusted bid amount is determined which will ensure placement in the desired position.

Having briefly described an overview of embodiments of the present invention, an exemplary operating environment for implementing embodiments of the present invention is now described. Referring to the drawings in general, and initially to FIG. 1 in particular, such an exemplary operating environment is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

When placing a bid for placement of an associated content item relative to other content in response to a search query, an advertiser (or other content provider) may associate such bid with one or more of three match types: exact match (type 1), phrase match (type 2), and/or broad match (type 3), each one included in the next (that is, type 1 included in type 2, and type 2 included in type 3). Subsequently, the advertiser (or other content provider) may wish to know the relative position in which the associated content item will be placed based on any one or combination of match types. For instance, the advertiser may inquire as to which relative placement position the placed bid will result for only type 1 matches, only type 2 matches, only type 3 matches, a combination of type 1 and type 2 matches, a combination of type 1 and type 3 matches, a combination of type 2 and type 3 matches, and/or a combination of type 1, type 2, and type 3 matches.

If the advertiser requests bid information for a match type and all lesser included match types (e.g., for match type 1 only, for match types 1 and 2 only, or for match types 1, 2, and 3), the desired placement position may be readily determined utilizing methods known to those of ordinary skill in the art. However, if bid information is missing for one or more lesser included match types, such information needs to be calculated and added into the placement determination. For instance, if bid information is requested for match type 3 only, information on bids for match types 1 and 2 must be added for placement to be accurately determined. If bid information is requested for match type 2 only or for match types 2 and 3 only, information on bids for match type 1 must be added. If bid information is requested for match types 1 and 3 only, information on bids for match type 2 must be added such that accurate relative content placement information may be determined. Stated differently, in order to ensure accurate relative content placement information for exact, phrase and broad matches, exact and phrase matches, or phrase and broad matches, missing information regarding any one of these match types should be added to the determination. In accordance with embodiments hereof, methods and systems for determining such missing information and applying it to the placement determination are described below.

Figure 2:
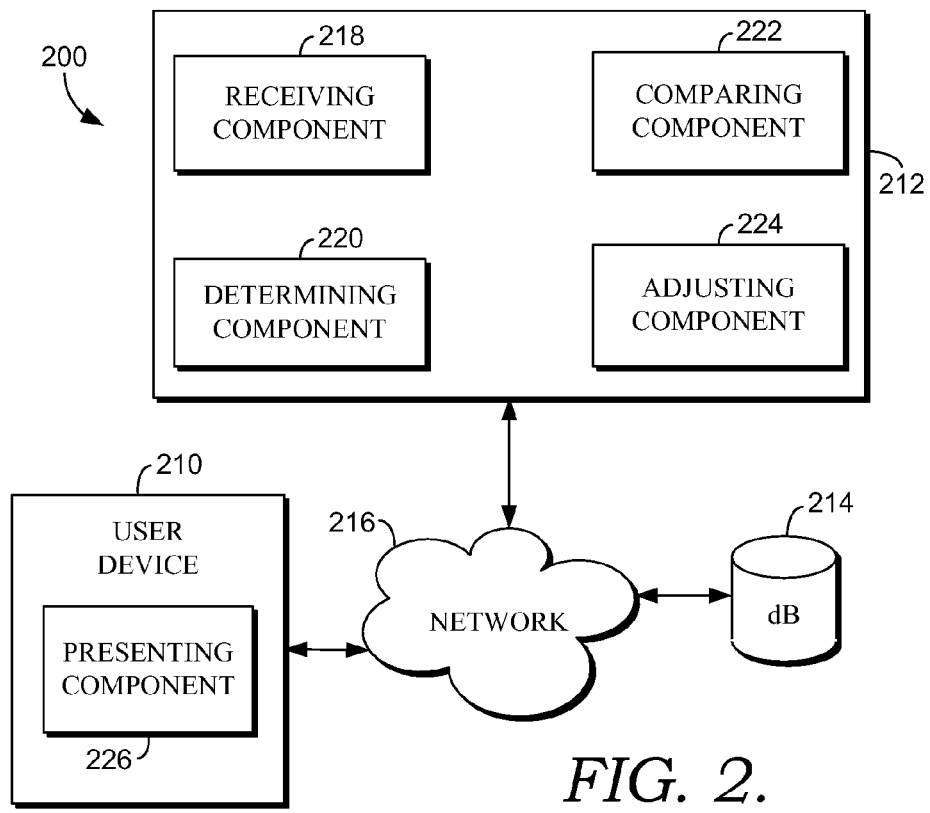
FIG. 2 is a block diagram of an exemplary computing system suitable for use in implementing embodiments of the present invention.

Turning now to FIG. 2, a block diagram is illustrated, in accordance with an embodiment of the present invention, showing a system 200 configured to determine bid amounts necessary to ensure advertisements or other content items will be presented in designated positions other than the first or most prominent position. It will be understood and appreciated by those of ordinary skill in the art that the bid determining system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes a user device 210, a server 212, and a data store 214 all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 is configured to store information related to advertisements and/or other content items for which payment is received in exchange for the presentation thereof, historical data related to user behavior with respect to particular keywords and the like. In various embodiments, such information may include, without limitation, cost-per-click and/or cost-per-impression data associated with particular keywords, advertisement content, received bid amounts, and the like. In embodiments, the data store 214 is configured to be searchable for one or more of the items stored in association therewith. It will be understood and appreciated by those of ordinary skill in the art that the information stored in the data store 214 may be configurable and may include any information relevant to advertisements, other content items, keywords, and the like. The content and volume of such information are not intended to limit the scope of embodiments of the present invention in any way. Further, though illustrated as a single, independent component, data store 214 may, in fact, be a plurality of data stores, for instance, a database cluster, portions of which may reside on the user device 210, the server 212, another external computing device (not shown), and/or any combination thereof.

Each of the user device 210 and the server 212 shown in FIG. 2 may be any type of computing device, such as, for example, computing device 100 described above with reference to FIG. 1. By way of example only and not limitation, each of the user device 210 and the server 212 may be a personal computer, desktop computer, laptop computer, handheld device, mobile handset, consumer electronic device, and the like. Additionally, the user device 210 may further include a keyboard, keypad, stylus, joystick, and any other input-initiating component that allows a user to provide wired or wireless data to the network 216, e.g., bid amounts and associated content items and/or desired placement positions. It should be noted, however, that the present invention is not limited to implementation on such computing devices, but may be implemented on any of a variety of different types of computing devices within the scope of embodiments hereof.

As shown in FIG. 2, the server 212 is configured to receive requests for particular placement positions and to determine bid amounts necessary to ensure placement in the desired positions. The server 212 includes a receiving component 218, a determining component 220, a comparing component 222, and an adjusting component 224. In some embodiments, one or more of the illustrated components 218, 220, 222 and 224 may be implemented as stand-alone applications. In other embodiments, one or more of the illustrated components 218, 220, 222 and 224 may be integrated directly into the operating system of the server 212 and/or the user device 210. It will be understood by those of ordinary skill in the art that the components 218, 220, 222 and 224 illustrated in FIG. 2 are exemplary in nature and in number and should not be construed as limiting. Any number of components may be employed to achieve the desired functionality within the scope of embodiments of the present invention.

The receiving component 218 is configured for receiving a bid amount (B(X)). The bid amount (B(X)) is associated with a given keyword, a content item (e.g., an advertisement) and a position (P) at which the content item provider (e.g., advertiser) desires the content item to be placed relative to other content items when the results of a search query that matches the given keyword(s) are presented. Content providers generally bid different amounts depending on the type of match associated with the search query; that is, depending on whether the match is an exact match (the search query is an exact match to the keyword(s)), a phrase match (the search query contains all of the desired keyword(s), consecutively presented in the same order), or a broad match (the search query contains all of the desired keyword(s) but are not in they are not in the same order). By way of example only, if the keywords an advertiser bid upon for a particular content item were "new car", a search query of "new car" would be an exact match, a search query of "buy new car" would be a phrase match, and a search query of "buy a car—new or used" would be a phrase match. Thus, the bid amount (B(X)) is generally based upon three different bid amounts, an exact match bid amount ($B_1(X)$), a phrase match bid amount ($B_2(X)$), and a broad match bid amount ($B_3(X)$).

In one embodiment, the bid amount (B(X)) is a weighted average of the exact match bid amount ($B_1(X)$), the phrase match bid amount ($B_2(X)$), and the broad match bid amount ($B_3(X)$), the weighting being calculated in accordance with an expected number of search queries that will match the bid type. For instance, an advertiser may bid $4.00 per impression for an exact match, $2.00 per impression for a phrase match and $1.00 per impression for a broad match. In this example, ($B_1(X)$)=$4.00, ($B_2(X)$)=$2.00 and ($B_3(X)$)=$1.00. As the weighting is calculated in accordance with an expected number of search queries that will match the bid type, the weighting in this example would be calculated based upon the expected number of search queries that will result in an impression of the content item. It will be understood that other pricing models may be utilized, for instance, a cost-per-click pricing model, and in accordance with such other pricing models, the weighting may be calculated differently, for instance, based upon the number of expected search queries that will result in a click-through or selection of the content item. Many such models are known to those of ordinary skill in the relevant art and the selected pricing model is not intended to limit the scope of embodiments of the present invention in any way. Rather, it is intended that embodiments hereof encompass all such pricing models and any combination thereof.

If the expected number of search queries is represented as a variable where $S_1$ equals the expected number of search queries that will result in an exact match, $S_2$ equals the expected number of search queries that will result in a phrase match, and $S_3$ equals the expected number of search queries that will result in a broad match, the bid amount (B(X)) may be calculated in accordance with the following equation:

$$B(X) = \frac{B_1(X) \cdot S_1 + B_2(X) \cdot S_2 + B_3(X) \cdot S_3}{S_1 + S_2 + S_3}. \quad \text{(Equation I)}$$

Thus, the receiving component 218 is configured to receive the bid amount (B(X)) and to calculate the bid amount (B(X)) based upon received bid amounts for each bid match type ($B_1(X)$, $B_2(X)$, and $B_3(X)$). Any and all such variations, and any combination thereof, are contemplated to be within the scope of embodiments of the present invention.

The determining component 220 is configured for determining, based upon the bid amount (B(X)) received or calculated in accordance with Equation I, a position (P(B)) at which the content item will be presented relative to a plurality of other content items if a search query is received that matches the bid upon keyword. Such determination is generally based upon historical data, as more fully described below. Additionally, the comparing component 222 is configured for comparing the determined position (P(B)) with the desired position (P) and determining if the determined position (P(B)) is within a pre-determined error threshold ($\epsilon$) relative to the desired position (P).

In some instances, the bid amount (B(X)) calculated in accordance with Equation I results in a good approximation of the amount necessary to ensure placement of the content item in the desired position (P) when a search query is received that matches the bid upon keyword. For instance, if position two in a vertical listing of positions is desired (wherein position one is the highest or top position in the listing), Equation I may result in a value, for instance, that ensures placement between position 1.95 and position 2.05. If a pre-determined error threshold ($\epsilon$) of 0.05 or more is acceptable, such values are close-enough approximations and no further calculating is necessary. However, there are some keywords for which Equation I may result in a bid value that will result in a placement position (P(B)) outside of the pre-determined error threshold ($\epsilon$) relative to the desired position (P), e.g., a value of 1.5 or 2.5. In this instance, an advertiser or other content provider may end up paying more than necessary to ensure the desired position or not enough to truly ensure the desired placement.

Figure 3:
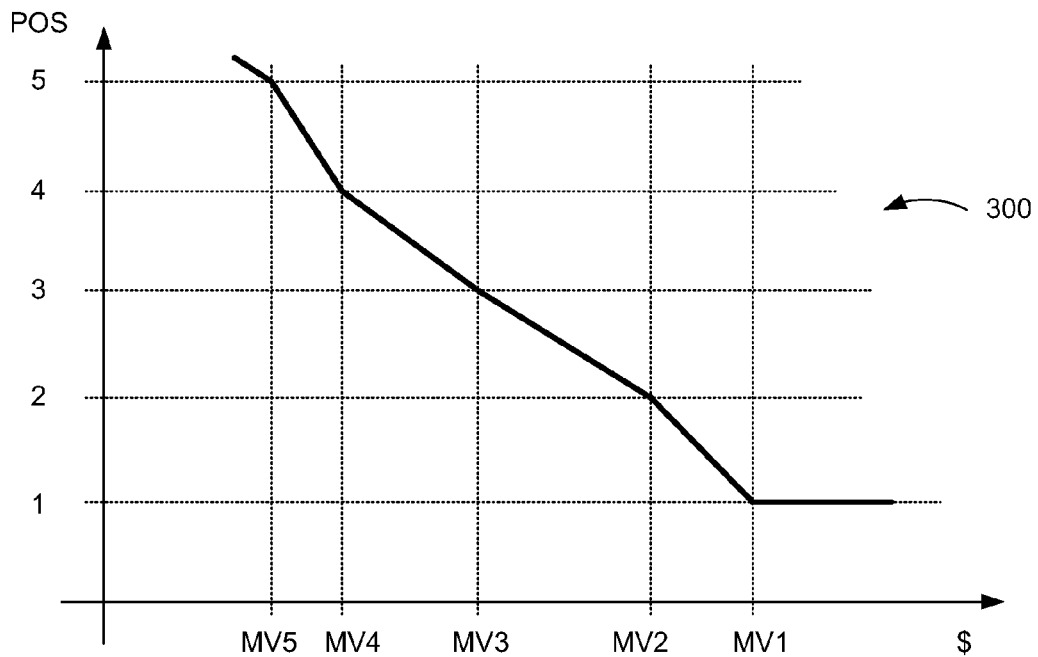
FIG. 3 is a schematic diagram showing an exemplary graph representing a positional function for a particular keyword associated with one of an exact match type, a phrase match type and a broad match type, in accordance with embodiments of the present invention.

Generally, the reason some bid amounts (B(X)) calculated in accordance with Equation I are not within a pre-determined error threshold (ε) has to do with the slope of the functions related to each of the bid match types. With reference to FIG. 3, a graph illustrating the function for any one of the exact match bid type, the phrase match bid type, and the broad match bid type is shown for a particular keyword (or keyword phrase) and designated generally as reference numeral 300. If determined position is considered as a function of bid amount, this may be represented as: Position=P(Bid). Based on historical data (stored, for instance, in association with data store 214 of FIG. 2), P(Bid) for a given keyword is known for each match type at particular monetization values, for instance, $MV_1, MV_2, \ldots MV_x$. Additionally, it is known that the function is decreasing. That is, if position one is higher than position two (for instance, in a vertical listing of content items wherein position one is the highest vertical position and, therefore, the most desirable position), then a bid for position one ($P(X_1)$)≧ a bid for position two ($P(X_2)$). It is this function which is represented graphically in FIG. 3.

In graph 300, the Y axis represents each of the first five placement positions and the X axis represents the monetization value of a bid necessary to ensure placement at a desired position (the monetization value being based upon the pricing model as hereinabove described) for a given keyword. As can be seen, there is a linear portion of the graph, approximating the true function but generally being based upon a discrete number of data points, associated with the transition between each of the placement positions. That is, there is a linear portion associated with the transition between position one and position two, a linear portion associated with the transition between position two and position three, and so on. Not only are each of the slopes within the illustrated graph different from one another, but a corresponding linear portion of a graph associated with the function for each of the other two bid types will likely differ from the illustrated slope. That is, the slope between position one and position two of the function graph for an exact match bid type will likely differ from the slope between position one and position two of the function graphs for each of the phrase match bid type and the broad match bid type, each of which is also likely to differ from one another. It is in those instances where the difference in slope of each of the three functions ($P_1(X)$ representing the function for exact match bid types, $P_2(X)$ representing the function for phrase match bid types, and $P_3(X)$ representing the function for broad match bid types, all at bid amount X) differ from one another by more than a reasonable, negligible amount that Equation I will result in a bid that ensures a position (P(B)) outside of the error threshold (ε) relative to the desired position (P). It is in these instances that additional adjustment of the bid amount (B(X)) is necessary, as more fully described herein below.

Thus, for each keyword there are three different position functions (for the 3 different match types: $P_1(X)$ for exact matches, $P_2(X)$ for phrase matches, and $P_3(X)$ for broad matches. The averaged position or weighted averaged position (by numbers of searches $S_1, S_2, S_3$ by each match type that result in a match with the bid upon keyword) may be represented in accordance with the following formula:

$$P(X) = \frac{P_1(X) \cdot S_1 + P_2(X) \cdot S_2 + P_3(X) \cdot S_3}{S_1 + S_2 + S_3}. \quad \text{(Equation II)}$$

If the reverse function of P is denoted with B, B is a function of the bid amount necessary to receive the desired placement position (P). That is: Bid=B (Position): B=P$^{-1}$: B(P(X))=X and P(B(Y))=Y.

These functions may also be defined as $B_1(X)$ for exact match bids, $B_2(X)$ for phrase match bids, and $B_3(X)$ for broad match bids. It is these functions that lead to Equation I, as discussed hereinabove.

Referring back to FIG. 2, the adjusting component 224 is configured for iteratively adjusting the bid amount (B(X)) until an adjusted bid amount ($B_A$) is determined that will cause an adjusted position ($P_A$) to be determined based thereupon that differs from the desired position (P) by less than or equal to the pre-determined threshold amount (ε) if the determined position (P(B)) and the desired position (P) differ from one another by greater than the pre-determined threshold amount (ε). In adjusting the bid amount, initially, the direction (Δ) in which the first bid amount (B(X)) needs to be adjusted is determined. If the determined position (P(B)) is less than the desired position, Δ=−1. If the determined position (P(B)) is greater than the desired position, Δ=+1. Subsequently, the adjusted bid amount ($B_A$) is determined utilizing the following formula:

$$B_A = B(X) + S\Delta, \quad \text{(Equation III)}$$

wherein S=the amount by which the first bid (B(X)) needs to be adjusted to equal the adjusted bid amount ($B_A$). S may be calculated utilizing the following formula:

$$S = \frac{P - P(B)}{C}, \quad \text{(Equation IV)}$$

$$\text{wherein } C = \frac{C_1 \cdot S_1 + C_2 S_2 + C_3 S_3}{S_1 + S_2 + S_3}. \quad \text{(Equation V)}$$

The determined bid amount (as a function of monetization value) will fall on a first linear portion of the function for each of the bid match types, that is, $P_1(X), P_2(X)$, and $P_3(X)$. Thus, $C_1$ is the maximum change needed for the exact match bid amount ($B_1(X)$) to reach a second linear portion of the first position function ($P_1(X)$), $C_2$ is the maximum change needed for the phrase match bid amount ($B_2(X)$) to reach a second linear portion of the second position function ($P_2(X)$), and $C_3$ is the maximum change needed for the broad match bid amount ($B_3(X)$) to reach the second linear portion of the third position function ($P_3(X)$). $C_1$ may be calculated in accordance with the following formulas:

$$C_1 = \begin{cases} 0 \text{ if } B \geq MV_1 \\ (P_1(MV_k) - P_1(MV_{k+1}))/(MV_k - MV_{k+1}) \text{ if } MV_{k+1} \leq B < MV_k, \Delta = 1 \\ (P_1(MV_{k+1}) - P_1(MV_k))/(MV_k - MV_{k+1}) \text{ if } MV_{k+1} < B \leq MV_k, \Delta = -1 \end{cases}$$

where $MV_1$ is the monetization value at which a proposed bid amount ensures placement at position one in accordance with the first position function ($P_1(X)$), and wherein if the proposed bid B is not ≧$MV_1$, it is placed between two consecutive monetization values, $MV_k$ and $MV_{k+1}$, $MV_k$ being the higher of the consecutive monetization values and $MV_{k+1}$ being the lower of the consecutive monetization values.

Similarly, $C_2$ may be calculated in accordance with the following formulas:

$$C_2 = \begin{cases} 0 & \text{if } B \geq MV_1 \\ (P_2(MV_k) - P_2(MV_{k+1}))/(MV_k - MV_{k+1}) & \text{if } MV_{k+1} \leq B < MV_k, \Delta = 1 \\ (P_2(MV_{k+1}) - P_2(MV_k))/(MV_k - MV_{k+1}) & \text{if } MV_{k+1} < B \leq MV_k, \Delta = -1 \end{cases}$$

where $MV_1$ is the monetization value at which a proposed bid amount ensures placement at position one in accordance with the second position function ($P_2(X)$), wherein if the proposed bid B is not $\geq MV_1$, it is placed between two consecutive monetization values, $MV_k$ and $MV_{k+1}$, $MV_k$ being the higher of the consecutive monetization values and $MV_{k+1}$ being the lower of the consecutive monetization values.

Similarly, $C_3$ may be calculated in accordance with the following formulas:

$$C_3 = \begin{cases} 0 & \text{if } B \geq MV_1 \\ (P_3(MV_k) - P_3(MV_{k+1}))/(MV_k - MV_{k+1}) & \text{if } MV_{k+1} \leq B < MV_k, \Delta = 1 \\ (P_3(MV_{k+1}) - P_3(MV_k))/(MV_k - MV_{k+1}) & \text{if } MV_{k+1} < B \leq MV_k, \Delta = -1 \end{cases}$$

where $MV_1$ is the monetization value at which a proposed bid amount ensures placement at position one in accordance with the third position function ($P_3(X)$), wherein if the proposed bid B is not $\geq MV_1$, it is placed between two consecutive monetization values, $MV_k$ and $MV_{k+1}$, $MV_k$ being the higher of the consecutive monetization values and $MV_{k+1}$ being the lower of the consecutive monetization values.

When applied in an iterative fashion, Equation IV may result in oscillations around the desired bid. To minimize such oscillation, the step (S) is decreased so that movement may occur into the next linear portion of the function ($P_1(X)$, $P_2(X)$, and/or $P_3(X)$). Thus, the maximum step $S_A = \text{Min }\{S, A_1, A_2, A_3\}$, wherein S is the current maximum step, $A_1$ is the minimum amount by which the first bid (B(X)) needs to be adjusted so the bid (B(X)) can move to the next linear portion of the exact match function ($P_1(X)$), $A_2$ is the minimum amount by which the first bid (B(X)) needs to be adjusted so that the bid (B(X)) can move to the next linear portion of the phrase match function ($P_2(X)$), and $A_3$ is the minimum amount by which the first bid (B(X)) needs to be adjusted so that the bid (B(X)) can move to the next linear portion for the broad match function ($P_3(X)$). $A_1$ may be calculated in accordance with the following formulas:

$$A_1 = \begin{cases} MV_k - B + \varepsilon_2 & \text{if } MV_{k+1} \leq B < MV_k, \Delta = 1 \\ B - MV_{k+1} + \varepsilon_2 & \text{if } MV_{k+1} < B \leq MV_k, \Delta = -1 \end{cases}$$

where if the proposed bid B is not $\geq MV_1$, it is placed between two consecutive monetization values, $MV_k$ and $MV_{k+1}$, $MV_k$ being the higher of the consecutive monetization values and $MV_{k+1}$ being the lower of the consecutive monetization values, and $\varepsilon_2$ is a small, pre-determined number necessary to go from the current linear portion of a position function to the next linear portion of the position function Similarly, $A_2$ may be calculated in accordance with the following formulas:

$$A_2 = \begin{cases} MV_k - B + \varepsilon_2 & \text{if } MV_{k+1} \leq B < MV_k, \Delta = 1 \\ B - MV_{k+1} + \varepsilon_2 & \text{if } MV_{k+1} < B \leq MV_k, \Delta = -1 \end{cases}$$

where if the proposed bid B is not $\geq MV_1$, it is placed between two consecutive monetization values, $MV_k$ and $MV_{k+1}$, $MV_k$ being the higher of the consecutive monetization values and $MV_{k+1}$ being the lower of the consecutive monetization values, and $\varepsilon_2$ is a small, pre-determined number necessary to go from the current linear portion of a position function to the next linear portion of the position function.

Similarly, $A_3$ may be calculated in accordance with the following formulas;

$$A_3 = \begin{cases} MV_k - B + \varepsilon_2 & \text{if } MV_{k+1} \leq B < MV_k, \Delta = 1 \\ B - MV_{k+1} + \varepsilon_2 & \text{if } MV_{k+1} < B \leq MV_k, \Delta = -1 \end{cases}$$

where if the proposed bid B is not $\geq MV_1$, it is placed between two consecutive monetization values, $MV_k$ and $MV_{k+1}$, $MV_k$ being the higher of the consecutive monetization values and $MV_{k+1}$ being the lower of the consecutive monetization values, and $\varepsilon_2$ a small, pre-determined number necessary to go from the current linear portion of a position function to the next linear portion of the position function.

After determining S, the adjusted bid ($B_A$) is calculated in accordance with the following equation:

$$B_A = B + S\Delta \quad \text{(Equation VI)}$$

Subsequently, it is determined (for instance, utilizing determining component 220 and comparing component 222 of FIG. 2) if the adjusted bid amount ($B_A$) results in a placement position (P(B)) that is within the pre-determined error threshold ($\epsilon$) of the desired position (P). If it is determined that the adjusted bid amount ($B_A$) does result in a placement position (P(B)) within the error threshold ($\epsilon$) of the desired position (P), the calculation is complete. If, however, it is determined that the adjusted bid amount ($B_A$) does not result in a placement position (P(B)) that is within the error threshold ($\epsilon$) of the desired position (P), the process is repeated beginning with Equation III, with the adjusted bid amount ($B_A$) being utilized as the determined bid amount (B(X)), until the desired position (P) and the determined placement position (P(B)) are within the error threshold ($\epsilon$) of one another. Once the desired position (P) and the determined placement position (P(B)) are within the error threshold ($\epsilon$) of one another, the bid amount ($B_A$) necessary to ensure placement at the desired position is presented, e.g., utilizing presenting component 226 of the user device 210.

Figure 4:
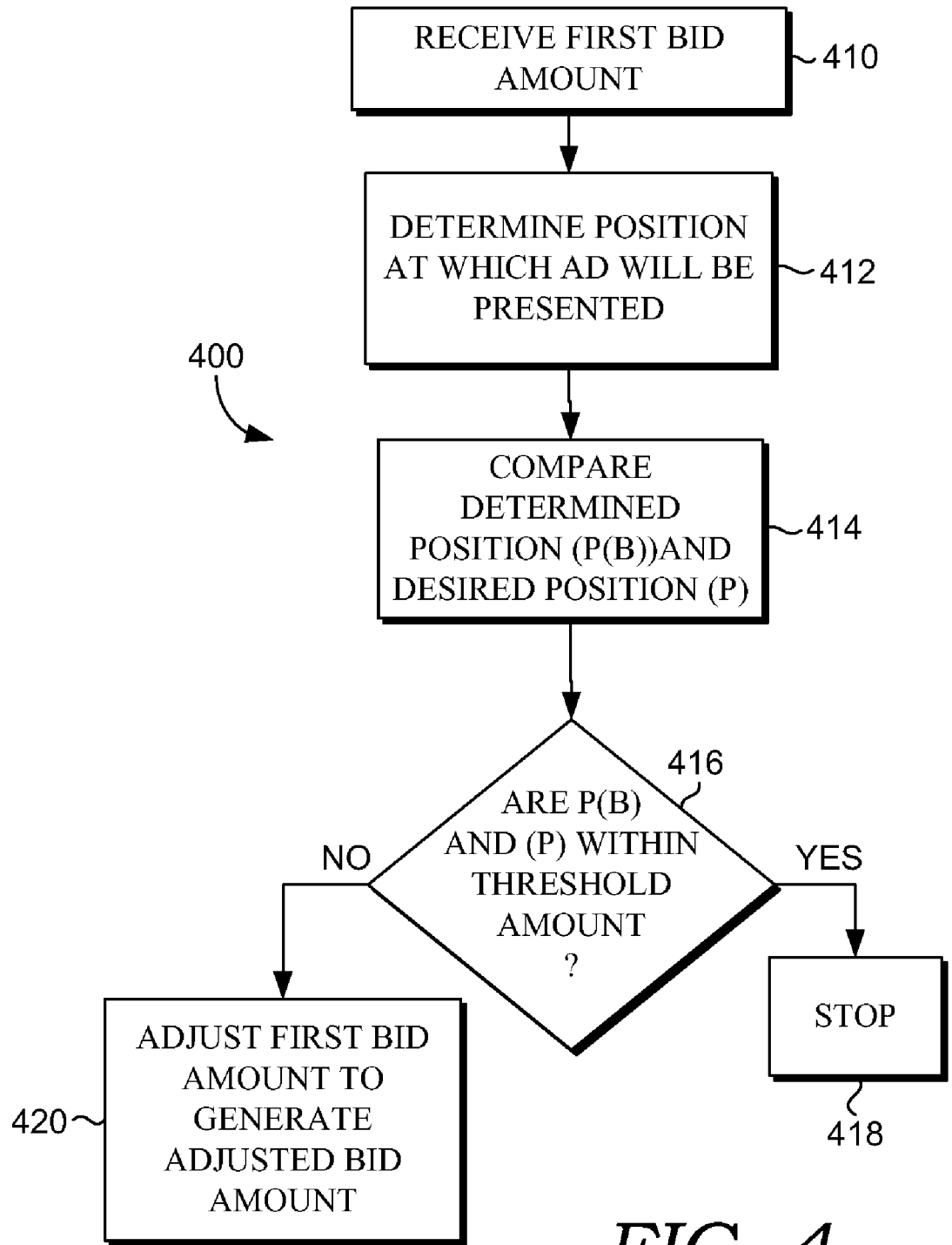
FIG. 4 is a flow diagram showing a method for determining bid amounts necessary to ensure an advertisement or other content item will be presented in a designated position other than the most prominent position (i.e., position one), in accordance with an embodiment of the present invention.

Turning now to FIG. 4, a flow diagram is illustrated that shows a method 400, in accordance with an embodiment of the present invention, for determining bid amounts necessary to ensure advertisements or other content items will be presented in positions other than position one when a search query is conducted that matches the bid upon keyword. Initially, as indicated at block 410, a first bid amount (B(X)) associated with a given keyword, an advertisement (or other content item) and a desired position (P) is received, e.g., utilizing receiving component 218 of FIG. 2. The first bid amount (B(X)) is calculated in accordance with Equation I.

Next, as indicated at block 412, a position (P(B)) at which the advertisement will be presented when a search query matching the bid upon keyword is determined based upon the first bid amount (B(X)), e.g., utilizing determining component 220 of FIG. 2. Next, the determined position (P(B)) and the desired position (P) are compared with one another (e.g., utilizing comparing component 222 of FIG. 2), as indicated at block 414, and it is determined if the desired position (P) and the determined position (P(B)) are within a pre-determined error threshold ($\epsilon$) of one another, as indicated at block 416. If the desired position (P) and the determined position (P(B)) are within the pre-determined error threshold ($\epsilon$) of one another, the method ceases, as indicated at block 418. If, however, the desired position (P) and the determined position (P(B)) are not within the pre-determined error threshold ($\epsilon$) of one another, the first bid amount (B(X)) is iteratively adjusted until an adjusted bid amount ($B_A$) is determined that will cause an adjusted position ($P_A$) to be determined based thereupon that differs from the desired position (P) by less than or equal to the pre-determined error threshold amount ($\epsilon$), for instance, utilizing adjusting component 224 of FIG. 2. This is indicated at block 420.

Figure 5:
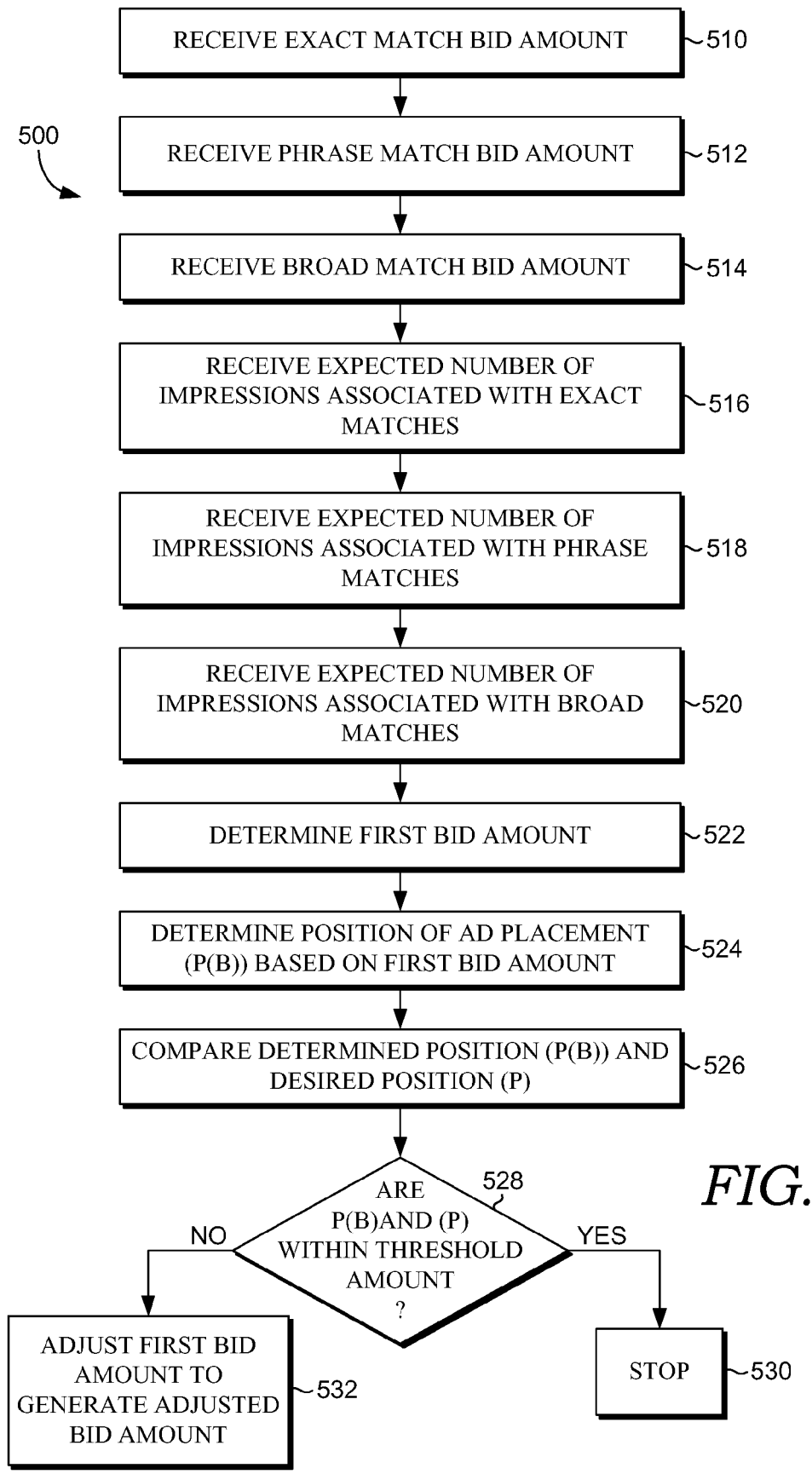
FIG. 5 is a flow diagram showing a method for determining bid amounts necessary to ensure an advertisement or other content item will be presented in a designated position other than the most prominent position (that is, position one), the flow diagram having more detail than that shown in FIG. 4, in accordance with an embodiment of the present invention.

Turning now to FIG. 5, a flow diagram is illustrated that shows a method 500, in accordance with an embodiment of the present invention, for determining bid amounts necessary to ensure advertisements will be presented in positions other than position one when search queries are received that match the bid upon keyword, the flow diagram having more detail than that shown in FIG. 4. Initially, as indicated at block 510, an exact match bid amount ($B_1(X)$) for a given keyword is received, the exact match bid amount ($B_1(X)$) being equal to $MV_2$ of a first position function ($P_1(X)$) if the desired position is position two, the exact match bid amount ($B_1(X)$) being equal to $MV_3$ of the first position function ($P_1(X)$) if the desired position is position three, etc., for instance, utilizing receiving component 218 of FIG. 2. Next, as indicated at block 512, a phrase match bid amount ($B_2(X)$) for the given keyword is received, the phrase match bid amount ($B_2(X)$) being equal to $MV_2$ of a second position function ($P_2(X)$) if the desired position is position two, the exact match bid amount ($B_2(X)$) being equal to $MV_3$ of the second position function ($P_2(X)$) if the desired position is position three, etc. (for instance, utilizing receiving component 218 of FIG. 2). Subsequently, a broad match bid amount ($B_3(X)$) for the given keyword is received, the broad match bid amount ($B_3(X)$) being equal to $MV_2$ of a third position function ($P_3(X)$) if the desired position is position two, the broad match bid amount ($B_3(X)$) being equal to $MV_3$ of the third position function ($P_3(X)$) if the desired position is position three, etc. (for instance, utilizing receiving component 218 of FIG. 2). This is indicated at block 514.

Next, an expected number of impressions associated with an exact match ($S_1$) is received (as indicated at block 516), an expected number of impressions associated with a phrase match ($S_2$) is received (as indicated at block 518), and an expected number of impressions associated with a broad match ($S_3$) is received (as indicated at block 520), for instance, utilizing receiving component 218 of FIG. 2.

It should be noted that the above-described description with respect to FIG. 5 applies to the scenario wherein bid information regarding type 1 (exact match) and type 2 (phrase match) is not requested but type 3 (broad match) bid information is requested. In the scenario wherein only type 1 (exact match) information is missing (that is, if information is requested only for type 2 (phrase) matches or for type 2 (phrase matches) and type 3 (broad matches), steps 514 and 520 of FIG. 5 would be skipped. Similarly, in the scenario wherein only type 2 (phrase match) bid information is not requested (that is, where only type 1 (exact match) and type 3 (broad match) bid information is requested), steps 510 and 516 of FIG. 5 would be skipped.

Subsequently, as indicated at block 522, a first bid amount (B(X)) is determined utilizing a weighted average of expected exact match impressions (or expected search queries if a different pricing model is utilized) multiplied by the exact match bid amount ($B_1(X)$), expected phrase match impressions (or expected search queries if a different pricing model is utilized) multiplied by the phrase match bid amount ($B_2(X)$), and expected broad match impressions (or expected search queries if a different pricing model is utilized) multiplied by the phrase match bid amount ($B_3(X)$). Subsequently, based upon the first bid amount (B(X)), a position (P(B)) at which the advertisement will be presented is determined, for instance, utilizing determining component 220 of FIG. 2. This is indicated at block 524. Next, as indicated at block 526, the determined position (P(B)) is compared with a desired position (P) (e.g., utilizing comparing component 222 of FIG. 2), and if the determined position (P(B)) and the desired position (P) differ from one another by greater than a pre-determined threshold amount ($\epsilon$), the first bid amount (B(X)) is iteratively adjusted until an adjusted bid amount ($B_A$) is determined that will cause an adjusted position ($P_A$) to be determined based thereupon that differs from the desired position (P) by less than or equal to the pre-determined threshold amount ($\epsilon$) (e.g., utilizing adjusting component 224 of FIG. 2). This is indicated at block 528.

If the desired position (P) and the determined position (P(B)) are within the pre-determined threshold ($\epsilon$) of one another, the method ceases, as indicated at block 530. If, however, the desired position (P) and the determined position (P(B)) are not within the pre-determined threshold ($\epsilon$) of one another, the first bid amount (B(X)) is iteratively adjusted until an adjusted bid amount ($B_A$) is determined that will cause an adjusted position ($P_A$) to be determined based thereupon that differs from the desired position (P) by less than or equal to the pre-determined threshold amount ($\epsilon$), for instance, utilizing adjusting component 224 of FIG. 2. This is indicated at block 532.

As can be understood, embodiments of the present invention relate to methods, systems, and computer storage media having computer-executable instructions embodied thereon that, when executed, perform methods in accordance with embodiments hereof, for determining bid amounts necessary to ensure advertisements (or other content items for which payment is exchanged for presentation thereof) will be presented in particularly designated positions other than the most prominent (or first) position when bid information associated with a lesser included match type is not requested. Based on historical data and the like, the placement position in which a received bid will cause an associated content item to be placed is compared to the desired placement position. If the determined placement position is not within a given error threshold of the desired placement position, the bid is iteratively adjusted in such a way that an adjusted bid amount is determined which will ensure placement in the desired position.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media having computer-executable instructions embodied thereon that, when executed, perform a method for determining bid amounts necessary to ensure advertisements will be presented in positions other than position one, the method comprising:
   (a) receiving a first bid amount (B(X)) associated with a given keyword, an advertisement and a desired position (P), wherein receiving a first bid amount comprises:
      (i) receiving an exact match bid amount ($B_1(X)$) associated with a linear portion of a first position function ($P_1(X)$) for the given keyword;
      (ii) receiving a phrase match bid amount ($B_2(X)$) associated with a linear portion of a second position function ($P_2(X)$) for the given keyword;
      (iii) receiving a broad match bid amount ($B_3(X)$) associated with a linear portion of a third position function ($P_3(X)$) for the given keyword;
      (iv) receiving an expected number of search queries ($S_1$) that will result in an exact match with the given keyword;
      (v) receiving an expected number of search queries ($S_2$) that will result in a phrase match with the given keyword;
      (vi) receiving an expected number of search queries ($S_3$) that will result in a broad match with the given keyword; and
      (vii) calculating the first bid amount (B(X)) utilizing the following formula:

$$B(X) = \frac{B_1(X) \cdot S_1 + B_2(X) \cdot S_2 + B_3(X) \cdot S_3}{S_1 + S_2 + S_3};$$

(b) determining, based upon the first bid amount (B(X)), a position (P(B)) at which the advertisement will be presented when a search query is received that matches the given keyword;
   (c) comparing the determined position (P(B)) with the desired position (P); and
   (d) if the determined position (P(B)) and the desired position (P) differ from one another by greater than a pre-determined threshold amount ($\epsilon$), iteratively adjusting the first bid amount (B(X)) until an adjusted bid amount ($B_A$) is determined that will cause an adjusted position ($P_A$) to be determined based thereupon that differs from the desired position (P) by less than or equal to the pre-determined threshold amount ($\epsilon$).

2. The one or more computer storage media of claim 1, further comprising: determining a direction ($\Delta$) in which the first bid amount (B(X)) needs to be adjusted,
   wherein if the determined position (P(B)) is less than the desired position (P), $\Delta = -1$,
   and wherein if the determined position (P(B)) is greater than the desired position (P), $\Delta = +1$.

3. The one or more computer storage media of claim 2, wherein iteratively adjusting the first bid amount B(X) comprises determining the adjusted bid amount ($B_A$) utilizing the following formula:

$$B_A = B(X) + S \Delta,$$

wherein S=the amount by which the first bid (B(X)) needs to be adjusted to equal the adjusted bid amount ($B_A$).

4. The one or more computer storage media of claim 3, further comprising calculating the amount by which the first bid (B(X)) needs to be adjusted to equal the adjusted bid amount ($B_A$) utilizing the following formula:

$$S = \frac{P - P(B)}{C},$$

wherein $C = \frac{C_1 \cdot S_1 + C_2 S_2 + C_3 S_3}{S_1 + S_2 + S_3},$ wherein $C_1$ is a change of the first position function ($P_1(X)$),
   wherein $C_2$ is a change of the second position function ($P_2(X)$),
   and wherein $C_3$ is a change of the third position function ($P_3(X)$).

5. The one or more computer storage media of claim 4, wherein $C_1=0$ if $B(X) \geq MV_1$, and wherein $MV_1$ is the monetization value at which a proposed bid amount ensures placement at position one in accordance with the first position function ($P_1(X)$).

6. The one or more computer storage media of claim 5, wherein $C_1=(P_1(MV_k)-P_1(MV_{k+1}))/(MV_k - MV_{k+1})$ if $MV_{k+1} \leq B(X) < MV_k$ and $\Delta=1$, wherein if the proposed bid B(X) is not $\geq MV_1$, it is placed between two consecutive monetization values, $MV_k$ and $MV_{k+1}$, wherein $MV_k$ is a higher monetization value than $MV_{k+1}$.

7. The one or more computer storage media of claim 6, wherein $C_1=(P_1(MV_{k+1})-P_1(MV_k))/(MV_k-MV_{k+1})$ if $MV_{k+1}<B(X) \leq MV_k$ and $\Delta=-1$.

8. The one or more computer storage media of claim 4, wherein $C_2=0$ if $B(X) \geq MV_1$, and wherein $MV_1$ is the monetization value at which a proposed bid amount ensures placement at position one in accordance with the second position function ($P_2(X)$).

9. The one or more computer storage media of claim 8, wherein $C_2=(P_2(MV_k)-P_2(MV_{k+1}))/(MV_k-MV_{k+1})$ if $MV_{k+1} \leq B(X) < MV_k$ and $\Delta=1$, wherein if the proposed bid B(X) is not $\geq MV_1$, it is placed between two consecutive monetization values, $MV_k$ and $MV_{k+1}$, wherein $MV_k$ is a higher monetization value than $MV_{k+1}$.

10. The one or more computer storage media of claim 9, wherein $C_2=(P_2(MV_{k+1})-P_2(MV_k))/(MV_k-MV_{k+1})$ if $MV_{k+1}<B(X) \leq MV_k$ and $\Delta=-1$.

11. The one or more computer storage media of claim 4, wherein $C_3=0$ if $B(X) \geq MV_1$, and wherein $MV_1$ is the monetization value at which a proposed bid amount ensures placement at position one in accordance with the third position function ($P_3(X)$).

12. The one or more computer storage media of claim 11, wherein $C_3=(P_3(MV_k)-P_3(MV_{k+1}))/(MV_k-MV_{k+1})$ if $MV_{k+1} \leq B(X) < MV_k$ and $\Delta=1$, wherein $MV_k$ is the monetization value at which the proposed bid amount ensures placement at the desired position (P) in accordance with the third position function ($P_3(X)$), and wherein if the proposed bid B(X) is not $\geq MV_1$, it is placed between two consecutive monetization values, $MV_k$ and $MV_{k+1}$, and wherein $MV_k$ is a higher monetization value than $MV_{k+1}$.

13. The one or more computer storage media of claim 12, wherein $C_3=(P_3(MV_{k+1})-P_3(MV_k)/(MV_k-MV_{k+1})$ if $MV_{k+1}<B(X) \leq MV_k$ and $\Delta=-1$.

14. The one or more computer storage media of claim 4, further comprising adjusting the amount by which the first bid (B(X)) needs to be adjusted to equal the adjusted bid amount ($B_A$) in accordance with the following equation:

$$S=\text{Min}\{S, A_1, A_2, A_3\},$$

wherein S is a current maximum step,
wherein $A_1$ is an amount by which the first bid (B(X)) needs to be adjusted to ensure a move to a next linear portion of the first position function ($P_1(X)$) for the given keyword,
wherein $A_2$ is an amount by which the first bid (B(X)) needs to be adjusted ensure a move to a next linear portion of the second position function ($P_2(X)$) for the given keyword, and
wherein $A_3$ is an amount by which the first bid (B(X)) needs to be adjusted to ensure a move to a next linear portion of the third position function ($P_3(X)$) for the given keyword.

15. The one or more computer storage media of claim 14, wherein $A_1=MV_k-B(X)+\epsilon_2$ if $MV_{k+1}\leq B(X)<MV_k$ and $\Delta=1$, wherein $A_1=B(X)-MV_{k+1}+\epsilon_2$ if $MV_{k+1}<B(X)\leq MV_k$ and $\Delta=-1$, wherein if the proposed bid B(X) is not $\geq MV_1$, it is placed between two consecutive monetization values, $MV_k$ and $MV_{k+1}$, wherein $MV_k$ is a higher monetization value than $MV_{k+1}$, and wherein $\epsilon_2$ is a minimum step necessary to go from a first linear portion of the first position function ($P_1(X)$) for the given keyword to a second linear portion of the first position function ($P_1(X)$).

16. The one or more computer storage media of claim 14, wherein $A_2=MV_k-B(X)+\epsilon_2$ if $MV_{k+1}\leq B(X)<MV_k$ and $\Delta=1$, wherein $A_2=B(X)-MV_{k+1}+\epsilon_2$ if $MV_{k+1}<B(X)\leq MV_k$ and $\Delta=-1$, wherein if the proposed bid B(X) is not $\geq MV_1$, it is placed between two consecutive monetization values, $MV_k$ and $MV_{k+1}$, wherein $MV_k$ is a higher monetization value than $MV_{k+1}$, and wherein $\epsilon_2$ is a minimum step necessary to go from a first linear portion of the second position function ($P_2(X)$) for the given keyword to a second linear portion of the second position function ($P_2(X)$).

17. The one or more computer storage media of claim 14, wherein $A_3=MV_k-B(X)+\epsilon_2$ if $MV_{k+1}\leq B(X)<MV_k$ and $\Delta=1$, wherein $A_3=B(X)-MV_{k+1}+\epsilon_2$ if $MV_{k+1}<B(X)\leq MV_k$ and $\Delta=-1$, wherein if the proposed bid B(X) is not $\geq MV_1$, it is placed between two consecutive monetization values, $MV_k$ and $MV_{k+1}$, wherein $MV_k$ is a higher monetization value than $MV_{k+1}$, and wherein $\epsilon_2$ is a minimum step necessary to go from a first linear portion of the third position function ($P_3(X)$) for the given keyword to a second linear portion of the third position function ($P_3(X)$).

18. A computerized system for determining bid amounts necessary to ensure content items will be presented in designated positions other than position one, the system comprising:
a receiving component receiving a bid amount (B(X)), the bid amount (B(X)) being associated with given keyword, a content item and a desired position (P) and being based upon an exact match bid amount ($B_1(X)$) for the given keyword, a phrase match bid amount ($B_2(X)$) for the given keyword, and a broad match bid amount ($B_3(X)$) for the given keyword;
a determining component determining, based upon the bid amount (B(X)), a position (P(B)) at which the content item will be presented relative to a plurality of other content items when a search query is received that matches the given keyword;
a comparing component comparing the determined position (P(B)) with the desired position (P);
a second determining component determining a direction ($\Delta$) in which the bid amount (B(X)) needs to be adjusted, wherein if the determined position (P(B)) is less than the desired position (P), $\Delta=-1$, and wherein if the determined position (P(B)) is greater than the desired position (P), $\Delta=+1$; and
an adjusting component for iteratively adjusting the bid amount (B(X)) in direction ($\Delta$) until an adjusted bid amount ($B_A$) is determined that will cause an adjusted position ($P_A$) to be determined based thereupon that differs from the desired position (P) by less than or equal to a pre-determined threshold amount ($\epsilon$) if the determined position (P(B)) and the desired position (P) differ from one another by greater than the pre-determined threshold amount ($\epsilon$).

19. A computerized method on at least one computing device for determining bid amounts necessary to ensure advertisements will be presented on a user device in particularly designated positions other than position one, the method comprising:
receiving on the at least one computing device an exact match bid amount ($B_1(X)$) associated with a linear portion of a first position function ($P_1(X)$) for a given keyword;
receiving on the at least one computing device a phrase match bid amount ($B_2(X)$) associated with a linear portion of a second position function ($P_2(X)$) for the given keyword;
receiving on the at least one computing device a broad match bid amount ($B_3(X)$) associated with a linear portion of a third position function ($P_3(X)$) for the given keyword;
receiving on the at least one computing device an expected number of search queries ($S_1$) that will result in an exact match with the given keyword;
receiving on the at least one computing device an expected number of search queries ($S_2$) that will result in a phrase match with the given keyword;
receiving on the at least one computing device an expected number of search queries ($S_3$) that will result in a broad match with the given keyword;
determining on the at least one computing device a first bid amount (B(X)) utilizing a weighted average of expected search queries that will result in an exact match with the given keyword ($S_1$) multiplied by the exact match bid amount ($B_1(X)$), expected search queries that will result in a phrase match with the given keyword ($S_2$) multiplied by the phrase match bid amount ($B_2(X)$), and expected search queries that will result in a broad match with the given keyword ($S_3$) multiplied by the phrase match bid amount ($B_3(X)$), wherein the first bid amount (B(X)) is calculated utilizing the following formula:

$$B(X) = \frac{B_1(X)\cdot S_1 + B_2(X)\cdot S_2 + B_3(X)\cdot S_3}{S_1 + S_2 + S_3};$$

determining on the at least one computing device, based upon the first bid amount (B(X)), a position (P(B)) at which the advertisement will be presented on the user device when a search query is received that matches the given keyword;
comparing on the at least one computing device the determined position (P(B)) with a desired position (P);
if the determined position (P(B)) and the desired position (P) differ from one another by greater than a pre-determined threshold amount ($\epsilon$), iteratively adjusting the first bid amount (B(X)) until an adjusted bid amount ($B_A$) is determined that will cause an adjusted position ($P_A$) to be determined based thereupon that differs from the desired position (P) by less than or equal to the pre-determined threshold amount ($\epsilon$); and communicating one of the first bid amount (B(X)) and the adjusted bid amount ($B_A$) from the at least one com computing device to the user device to be presented.

* * * * *

UNITED STATES PATENT AND TRADEMARK OFFICE
CERTIFICATE OF CORRECTION

| | | |
|---|---|---|
| PATENT NO. | : 7,958,005 B2 | |
| APPLICATION NO. | : 11/930973 | |
| DATED | : June 7, 2011 | |
| INVENTOR(S) | : Tchavdar Dangaltchev | |

It is certified that error appears in the above-identified patent and that said Letters Patent is hereby corrected as shown below:

In column 18, line 2, in Claim 19, delete "one com" and insert -- one --, therefor.

Signed and Sealed this
Thirtieth Day of August, 2011

David J. Kappos
*Director of the United States Patent and Trademark Office*